United States Patent [19]

Craggs

[11] Patent Number: 5,144,175
[45] Date of Patent: Sep. 1, 1992

[54] COOLING FAN FOR ELECTRIC MOTORS

[75] Inventor: Jack L. Craggs, Cincinnati, Ohio

[73] Assignee: Siemens Energy & Automation, Inc., Alpharetta, Ga.

[21] Appl. No.: 700,723

[22] Filed: May 15, 1991

[51] Int. Cl.⁵ .......................... H02K 1/32; H02K 9/06
[52] U.S. Cl. ...................................... 310/63; 310/62;
310/62; 416/223 B
[58] Field of Search ................. 416/223 B; 310/60 R,
310/61, 62, 63, 124, 125, 126, 166, 182, 210,
211, 212, 261

[56] References Cited

U.S. PATENT DOCUMENTS

| 821,249 | 5/1906 | Lundell | 310/62 |
|---|---|---|---|
| 856,423 | 6/1907 | Reist | 310/63 |
| 1,628,086 | 5/1927 | Warner | 310/63 |
| 2,046,226 | 6/1936 | Weightman et al. | 416/223 B |
| 2,074,067 | 3/1937 | Darnell | 310/62 |
| 2,159,695 | 5/1939 | Gorham | 310/211 |
| 2,167,487 | 7/1939 | Moss | 310/63 |
| 2,244,406 | 6/1941 | Schonwald | 310/62 |
| 2,293,508 | 8/1942 | Killam | 310/62 |
| 2,615,937 | 10/1952 | Ludwig et al. | 310/63 |
| 2,782,327 | 2/1957 | Worth | 310/59 |
| 2,967,959 | 1/1961 | Waters | 310/59 |
| 3,075,106 | 1/1963 | Chi | 310/60 |
| 3,213,304 | 10/1965 | Landberg et al. | 310/63 |
| 3,389,278 | 6/1968 | Jaeschke | 310/105 |
| 3,725,706 | 4/1973 | Lukens | 310/62 |
| 3,749,949 | 7/1973 | Muller | 310/59 |
| 3,778,652 | 12/1973 | Endress | 310/261 |
| 4,128,778 | 12/1978 | Merkle et al. | 310/67 R |
| 4,158,225 | 6/1979 | Hertz | 310/211 |
| 4,399,379 | 8/1983 | Marks et al. | 310/62 |
| 4,588,911 | 5/1986 | Gold | 310/62 |
| 4,763,031 | 8/1988 | Wang | 310/83 |
| 4,879,483 | 11/1989 | Barahia | 310/63 |
| 4,922,146 | 5/1990 | Vanduyn | 310/59 |

FOREIGN PATENT DOCUMENTS

| 2844245 | 4/1980 | Fed. Rep. of Germany | 310/62 |
|---|---|---|---|
| 0165895 | 9/1984 | Japan | 416/223 b |
| 1435847 | 11/1988 | U.S.S.R. | 416/223 B |
| 0723706 | 2/1955 | United Kingdom | 416/223 B |

Primary Examiner—Steven L. Stephan
Assistant Examiner—C. LaBalle

[57] ABSTRACT

The present invention provides an improved rotor and end connector for an induction motor. The end connector adjoins a rotor core. The rotor core includes a plurality of spaced ventilation openings and defines an aperture for capturing a motor shaft. The end connector should preferably surround and be concentric with the inner ventilation openings. To increase ventilation efficiency, the end connector has a plurality of spaced fan blades. Each of the fan blades has a sloping inner surface and backward curving outer surface. The backward curving outer surface is substantially perpendicular to the end connector, and directs air flow radially outward.

13 Claims, 2 Drawing Sheets

COOLING FAN FOR ELECTRIC MOTORS

BACKGROUND OF THE INVENTION

This invention relates to cooling fans for electric motors and generators and more particularly to improved rotor and end connectors for induction motors having precisely shaped fan blades to maximize ventilation efficiency, without diminishing the strength of the blades.

Dynamoelectric machines, particularly high speed induction electric motors, produce a lot of heat, particularly in the rotor winding and the laminations of steel that make up the body of the rotor. Various attempts have been made to provide ventilation at one end of the rotor using radial fan blades. For example, in U.S. Pat. No. 821,249 (Lundell), the patentee states that he attempts to improve ventilation of a dynamoelectric machine by providing end plates having web-like arms which appear to force air through a flange to cool the winding.

According to U.S. Pat. No. 1,628,086 (Warner), the patentee includes a fan in an electric motor. The fan appears to force air around one end of the coils in order to cool the motor coils and field laminations.

Similarly, the patentee of U.S. Pat. No. 3,075,106 (Chi) states that he uses an improved rotor to cool a hermetic refrigeration motor-compressor unit. According to the patentee, the rotor has a plurality of impeller blades at each end, with the outer portion of each blade leading the inlet portion in the direction of rotation of the rotor. The patentee also states that the impeller blades direct refrigerant cooling fluid into contact with the winding end turns to transfer heat away from the motor.

None of the foregoing attempts, however, appears to provide a satisfactory solution to the problem of providing a suitable cooling fan for an induction motor.

SUMMARY OF THE INVENTION

The present invention provides an improved rotor for an induction motor, comprising a rotor core and an end connector. The rotor core defines an aperture for capturing a motor shaft and includes a plurality of spaced ventilation openings. The end connector comprises a ring of conductive material, and cooperates with the plurality of spaced ventilation openings on the rotor core. The end connector ring should preferably surround and be concentric with the ring of ventilation openings. To increase ventilation efficiency, the end connector ring has a plurality of spaced fan blades. Each of the fan blades has backward curving inner and outer surfaces, with the outer surface substantially perpendicular to the end connector.

The present invention also provides a fan blade for inclusion in or attachment to an end connector of a rotor for an electric induction motor. The fan blade comprises a bottom edge and a top edge, with the bottom edge wider than the top edge. The fan blade also has an inner surface, an outer surface, a leading edge and a trailing edge. The inner surface curves from the wider bottom edge to the narrower top edge. The outer surface is substantially perpendicular to the bottom edge, permitting the outer surface to move air along a predetermined path. The leading edge preferably forms an entry angle of between about 20° and about 40° with respect to a tangent point at the tip of the blade. The trailing edge preferably is inwardly biased or offset with respect to the outer surface of the fan blade.

The invention, together with further objects and attendant advantages, will be best understood by reference to the following detailed description taken in conjunction with the accompanying drawings.

DETAILED DESCRIPTION OF THE PREFERRED EMBODIMENT

Figure 1:
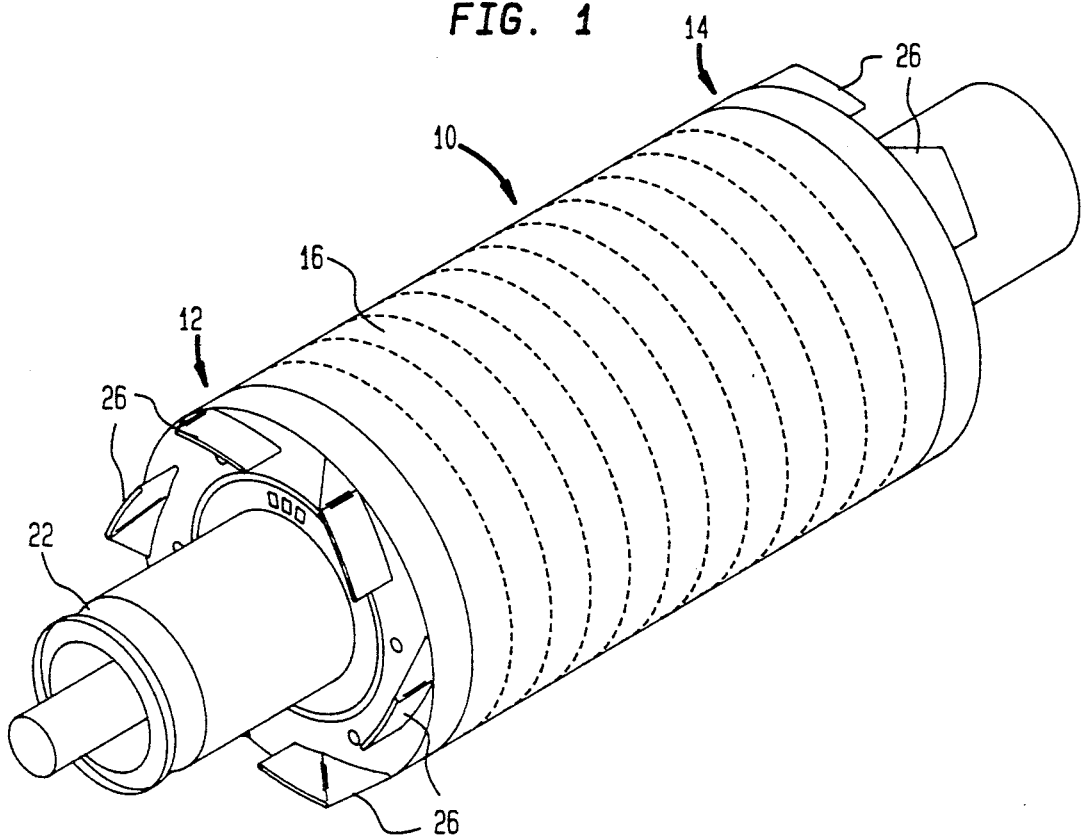
FIG. 1 is a side view of an induction motor rotor including a preferred embodiment of the improved end connector with the fan blades of the present invention extending therefrom.
Figure 2:
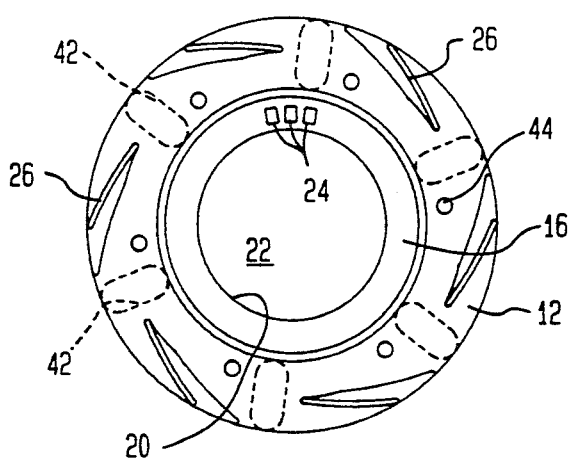
FIG. 2 is front elevational view of the rotor of FIG. 1.

Referring to the drawings, FIG. 1 shows a side view of a rotor generally designated by the reference numeral 10 including at each end an improved end connector 12, 14 of the present invention. As shown in FIG. 2, the end connector 12, 14 adjoins a rotor core 16. The rotor core 16 defines a central aperture 20 for capturing a motor shaft 22 (FIG. 1), and includes a plurality of spaced ventilation openings 24 located within the inside diameter of the end connector 12, 14. The end connector 12, 14 has extending therefrom a plurality of fan blades 26. These airfoil-shaped fan blades 26 have a geometry arrived at through experimentation in order to maximize air circulating efficiency, while preserving mechanical strength of the fan blades 26, and their attachment to the end connector 12, 14, and maintaining desired low noise levels.

Figure 3:
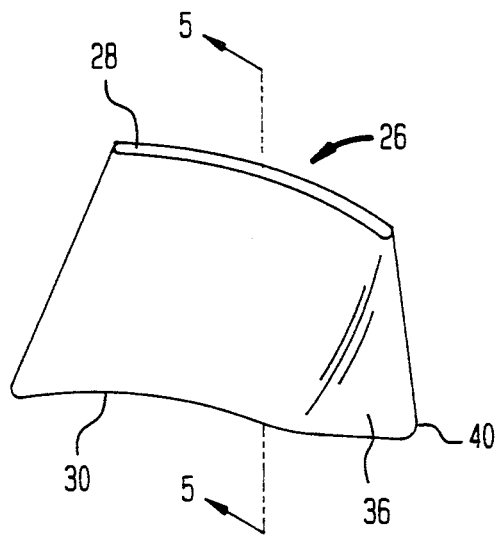
FIG. 3 is a front elevational view of a fan blade of the embodiment of FIG. 1.
Figure 4:
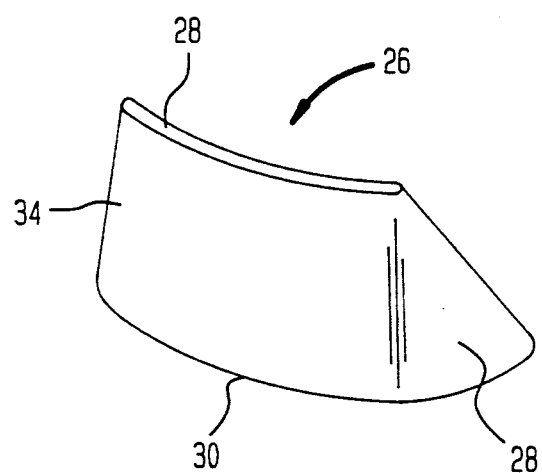
FIG. 4 is a rear elevational view of the fan blade of FIG. 3.
Figure 5:
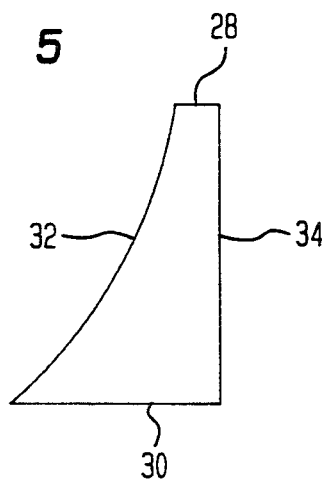
FIG. 5 is a cross-sectional view of the fan blade of FIG. 3 taken along line 5—5 of FIG. 3.

The geometry of the fan blades 26 can best be understood by reference to FIGS. 3, 4 and 5. Referring to FIGS. 3-5, each fan blade 26 includes a top edge 28, a bottom edge 30, an inner face 32, an outer face 34 (FIG. 4), a leading edge 36 (FIG. 3) and a trailing edge 38 (FIG. 4). As best shown in FIG. 5, the fan blade 26 is tapered in cross-section: the inner surface 32 curves backwardly from the bottom edge 30 to the top edge 28, as shown in FIG. 5. On the other hand, the outer surface 34 is substantially perpendicular with respect to the plane defined by the bottom edge 30. The dimensions vary according to the size and turning speed of the rotor. For example, for a motor designed to have the rotor turn at about 3600 rpm with a 12.5 inch diameter rotor, the bottom edge 30 should be about ⅜ inch thick and the top edge 28 should be 3/16 inch thick. The inner surface 32 should slope evenly from the bottom edge 30 to the top edge 28. This inner surface 32 allows the fan blade to preserve mechanical strength while diminishing overall thickness, weight and bulk of the fan blades 26. The outer surface 34, as stated above, is essentially perpendicular to the bottom edge 30 and therefore to the end connector. The outer surface 34 is also preferably substantially parallel to the plane defined by the motor shaft 22, as may be seen in FIG. 1. The substantially backward curved vertical outer surface 34 directs air flow radially outward (FIG. 1). In order to aid ventilation, the laminations comprising the rotor 10 core have spaces between packets of laminations. These spaces (not shown) act as radial vents to allow air to blow outward to maintain a cooler rotor temperature. This lower temperature helps to reduce electrical resistance in the rotor, thereby improving the efficiency of the motor.

Figure 6:
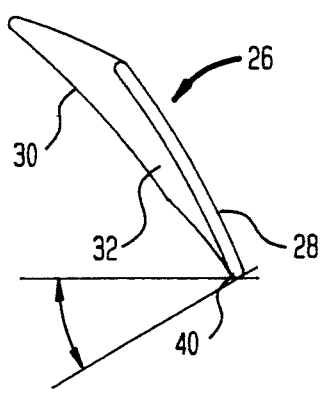
FIG. 6 is an enlarged view of the fan blade of the end connector of FIG. 1.

Importantly, the leading edge 36 of the fan blade 26 is shaped and positioned on the end connectors 12, 14 so that the tip 40 of the blade forms an angle of between 20° and 40° from the tangent formed at the tip of the blade, as shown in FIG. 6. Preferably, the angle formed by the tangent ranges from about 20° to about 30°, although an angle of between about 24° to about 26° appears optimal, based upon experiments conducted thus far. Of course, the exact angle formed by the tangent at the point of the tip 40 of the fan blade 26 may be varied depending on the size and duty of the particular motor, and a person of ordinary skill designing an end connector 12, 14 can vary the entry angle of the fan blades 26 and their placement on the end connector 12, 14 to optimize the cooling and ventilating power of the improved end connectors 12, 14.

In addition, the trailing edge 38 tapers beyond the actual trailing edge of the outer face 34 of the blade 26, as shown in FIG. 4, and is biased inwardly with respect to the longitudinal curve defined by the blade. This shape helps reduce the rotational forces on the blade 26 without substantially diminishing the air current.

The fan blades 26 may be individually cast or forged and welded to the end connectors 12, 14. Alternatively, and preferably, the fan blades should be integrally cast with the end connectors 12, 14. If cast, the end connector 12, 14 as cast should be designed so that the casting includes a plurality of preferably oval shaped metal risers 42, as shown in FIG. 2. These metal risers 42 stay molten while other parts of the casting are cooling and solidifying. This allows shrinkage to occur in the casting without distorting the end connectors 12, 14. Once the casting has cooled, the risers 42 may be cut off. The casting should also preferably include a plurality of pins 44 spaced around the periphery of the outer ring 18 between adjacent fan blades 26. The pins 44 have washers or other weights (not shown) placed thereon to properly balance the end connectors 12, 14. Once the desired balance is achieved, the ends of the pins 44 are flattened using a hammer to secure the washers in place and prevent them from sliding off.

Having described the invention and how it is made, a person of ordinary skill can now readily understand how the improved end connectors 12, 14 and rotor 10 of the present invention operate. When the rotor 10 is being turned by the inductive forces in the induction motor, the fan blades create air currents. Some air passes through the plurality of ventilation openings 24 in the rotor core 16 which permits air to blow through spaces in the rotor (not shown). An air current also passes around the outside of the rotor 10 and provides a cooling air current to the stator core and winding. The design of the fan blades 26 provides higher ventilating efficiency because of the shape and orientation of the fan blade 26 described above. Additionally, the improved aerodynamic fan design seems to produce less noise. The tapered blade thickness provides substantial mechanical strength to withstand the effects of rotational forces at the base of the fan blade 26. Additionally, the ventilation openings 24, which allow air to enter through spaces in the rotor laminations, obviate the need for fluted shafts. Also, because air can enter axially through the end connectors 12, 14 at both ends, increased cooling results, permitting extended core length.

Various modifications and changes to the preferred embodiment described above will be apparent to those skilled in the art. Such changes and modifications can be made without departing from the spirit and scope of the present invention, and it is therefore intended that such changes and modifications be covered by the following claims including all equivalents.

I claim:

1. An improved rotor for an induction motor, comprising:
   a rotor core including a plurality of spaced ventilation openings and defining an aperture for capturing a motor shaft;
   at least one end connector adjoining the rotor, and having a plurality of spaced fan blades, each of the fan blades having backward curving inner and outer surfaces with the outer surface substantially perpendicular to the end connector, and positioned in order to direct air flow radially outward, wherein each of the plurality of fan blades is oriented on the end connector to form a blade entry angle of between 20° and 40°, has a leading edge substantially perpendicular to the end connector, and extends from a point adjacent to the end connector to a top edge and tapers from the point to the top edge and has a trailing edge inwardly biased with respect to the outer surface.

2. An improved rotor in accordance with claim 1, wherein the plurality of fan blades are cast integrally with and extend from the end connector.

3. An improved rotor in accordance with a claim 1, wherein the plurality of the fan blades are welded to the end connector.

4. A fan blade for inclusion in an end connector for a rotor in an electric induction motor, comprising:
   a bottom edge and a top edge, the bottom edge wider than the top edge, an inner surface, an outer surface, a leading edge and a trailing edge, the inner surface curved from the bottom edge to the top edge, the outer surface backwardly curved and substantially perpendicular to the bottom edge for moving air along a predetermined path, the leading edge forming an entry angle of between about 20° and about 40° with respect to a tangent point at the leading edge of the blade, the trailing edge offset toward the inner surface of the fan blade.

5. A fan blade in accordance with claim 4, wherein the radius of curvature defined by the inner surface ranges from about 40% to about 50% of the diameter defined by the outside surface of the fan blade.

6. A fan blade in accordance with claim 5, wherein the fan blade has an entry angle of between about 20° and about 30° with respect to a tangent point at the leading edge of the fan blade.

7. A fan blade in accordance with claim 6, wherein the fan blade has an entry angle of between about 22° and about 28° with respect to a tangent point at the leading edge of the fan blade.

8. A fan blade in accordance with claim 7, wherein the fan blade has an entry angle of between about 24° and about 26° with respect to a tangent point at the leading edge of the fan blade.

9. A fan blade in accordance with claim 7, wherein the fan blade has an entry angle of between about 22° and about 28° with respect to a tangent point formed at the tip of the blade.

10. A fan blade in accordance with claim 8, wherein the fan blade has an entry angle of between about 24° and about 26° with respect to a tangent point found at the tip of the blade.

11. An improved rotor for an induction motor, comprising:
   a rotor core including a plurality of spaced ventilation openings and including a central aperture for capturing a motor shaft; and
   a pair of end connectors adjoining opposite sides of the rotor core, the end connectors having a plurality of fan blades extending outwardly therefrom, each of the fan blades having a bottom edge, a top edge, an inner surface, an outer surface, a leading edge defining a tip, and a trailing edge, the bottom edge wider than the top edge, the outer and inner surfaces backwardly curved, the outer surface substantially perpendicular to the bottom edge, the tip of the leading edge forming an angle of between about 20° and about 30° with respect to a tangent formed at the tip of the blade, the trailing edge offset toward the inner surface of the fan blade.

12. An improved rotor in accordance with claim 11, wherein the plurality of fan blades are spaced around the periphery of the end connector in order to direct air flow radially outward.

13. An improved rotor in accordance with claim 12, wherein the fan blades are integrally cast with the end connector.

* * * * *